United States Patent
Jang

(10) Patent No.: US 8,913,583 B2
(45) Date of Patent: Dec. 16, 2014

(54) RECEIVING INFORMATION RELATION RADIO ACCESS TECHNOLOGY CAPABILITIES OF A MOBILE STATION

(75) Inventor: Ke-Chi Jang, Plano, TX (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 13/394,199

(22) PCT Filed: Sep. 14, 2010

(86) PCT No.: PCT/US2010/048710
§ 371 (c)(1),
(2), (4) Date: Mar. 5, 2012

(87) PCT Pub. No.: WO2011/032122
PCT Pub. Date: Mar. 17, 2011

(65) Prior Publication Data
US 2012/0163301 A1    Jun. 28, 2012

Related U.S. Application Data

(60) Provisional application No. 61/242,226, filed on Sep. 14, 2009.

(51) Int. Cl.
*H04W 4/00* (2009.01)
*H04W 48/18* (2009.01)
*H04W 88/06* (2009.01)
*H04W 8/24* (2009.01)

(52) U.S. Cl.
CPC .............. *H04W 48/18* (2013.01); *H04W 88/06* (2013.01); *H04W 8/24* (2013.01)
USPC .............................. 370/330; 370/335; 370/337

(58) Field of Classification Search
None
See application file for complete search history.

(56) References Cited

U.S. PATENT DOCUMENTS 5,963,869 A * 10/1999 Fehnel ........................... 455/511
6,195,546 B1 * 2/2001 Leung et al. ................... 455/419

(Continued)

FOREIGN PATENT DOCUMENTS

CN          1489871          4/2004
KR    10-2008-0809260 B1    3/2008

(Continued)

OTHER PUBLICATIONS

International Search Report and Written Opinion dated Feb. 28, 2011 for International Application Serial No. PCT/US2010/048710, International Filing Date: Sep. 14, 2010 consisting of 10-pages.

(Continued)

*Primary Examiner* — Jackie Zuniga Abad
*Assistant Examiner* — Eric P Smith
(74) *Attorney, Agent, or Firm* — Meyertons, Hood, Kivlin, Kowert & Goetzel, P.C.

(57) ABSTRACT

A base station sends a request for information relating to radio access technology capabilities of a mobile station. The base station receives a message containing information relating to radio access technology capabilities of the mobile station, where the message is responsive to the request, and the information contained in the message specifies that the mobile station supports at least two different types of radio access technologies useable by the mobile station to communicate over a wireless link between the base station and the mobile station. The base station is able to control which of the at least two different types of radio access technologies the mobile station is to use.

8 Claims, 3 Drawing Sheets

(56) References Cited

U.S. PATENT DOCUMENTS

| | | | |
|---|---|---|---|
| 6,771,964 B1* | 8/2004 | Einola et al. | 455/437 |
| 8,165,559 B1* | 4/2012 | Klesper et al. | 455/404.1 |
| 8,374,619 B2 | 2/2013 | Jones et al. | |
| 8,428,600 B2 | 4/2013 | Ishii et al. | |
| 2005/0083893 A1* | 4/2005 | Purkayastha et al. | 370/338 |
| 2005/0119001 A1* | 6/2005 | Watanabe | 455/436 |
| 2005/0136898 A1* | 6/2005 | Shaheen et al. | 455/414.1 |
| 2005/0221824 A1 | 10/2005 | Lee et al. | |
| 2006/0221903 A1* | 10/2006 | Kauranen et al. | 370/331 |
| 2006/0264217 A1* | 11/2006 | Shaheen | 455/445 |
| 2008/0077691 A1* | 3/2008 | Park et al. | 709/226 |
| 2009/0092080 A1* | 4/2009 | Balasubramanian et al. | 370/328 |
| 2010/0240370 A1* | 9/2010 | Pandit et al. | 455/436 |
| 2010/0317346 A1* | 12/2010 | Ali et al. | 455/436 |
| 2011/0116619 A1* | 5/2011 | Bjorkner et al. | 379/315 |

FOREIGN PATENT DOCUMENTS

| | | |
|---|---|---|
| KR | 10-2008-0061487 A1 | 7/2008 |
| RU | 2007105980 | 8/2008 |
| RU | 2007118570 | 12/2008 |
| WO | 2008119381 A1 | 10/2008 |

OTHER PUBLICATIONS

Office Action and translation thereof in related Japanese Patent Application No. 2012-528960, May 15, 2013, pp. 1-7.

Decision on Patent Grant from Russian Application No. 2412-199620RU/8132, mailed May 29, 2014, English and Russian versions, pp. 1-20.

Office Action from Chinese Application No. 201080043804.x, mailed Mar. 4, 2014, English and Chinese versions, pp. 1-84.

* cited by examiner

RECEIVING INFORMATION RELATION RADIO ACCESS TECHNOLOGY CAPABILITIES OF A MOBILE STATION

CROSS-REFERENCE TO RELATED APPLICATIONS

This application is a Submission Under 35 U.S.C. §371 for U.S. National Stage Patent Application of International Application Number: PCT/US2010/048710, filed Sep. 14, 2010 entitled "RECEIVING INFORMATION RELATION RADIO ACCESS TECHNOLOGY CAPABILITIES OF A MOBILE STATION," which claims priority to U.S. Provisional Application Ser. No. 61/242,226, filed Sep. 14, 2009, the entirety of both which are incorporated herein by reference.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2. CDMA 2000 defines one type of packet-switched wireless access network, referred to as the HRPD (High Rate Packet Data) wireless access network.

Another more recent standard that provides packet-switched wireless access networks is the Long Term Evolution (LTE) standard from 3GPP, which seeks to enhance the UMTS technology. The LTE standard is also referred to as the EUTRA (Evolved Universal Terrestrial Radio Access) standard. The EUTRA technology is considered to be fourth generation (4G) technology, to which wireless network operators are migrating to provide enhanced services. Another alternative 4G wireless technology is WiMAX (Worldwide Interoperability for Microwave Access), as defined by IEEE 802.16. Other wireless technologies also exist.

SUMMARY

In general, according to some embodiments, a base station sends a request for information relating to radio access technology capabilities of a mobile station. The base station receives a message containing information relating to radio access technology capabilities of the mobile station, where the message is responsive to the request, and the information contained in the message specifies that the mobile station supports at least two different types of radio access technologies useable by the mobile station to communicate over a wireless link between the base station and the mobile station. The base station is able to control which of the at least two different types of radio access technologies the mobile station is to use, and/or the type of connection (e.g. voice-over-Internet Protocol, data only, voice only, etc) for a particular radio access technology.

Other or alternative features will become apparent from the following description, from the drawings, and from the claims.

BRIEF DESCRIPTION OF THE DRAWINGS

Some embodiments are described with respect to the following figures.

DETAILED DESCRIPTION

Figure 1:
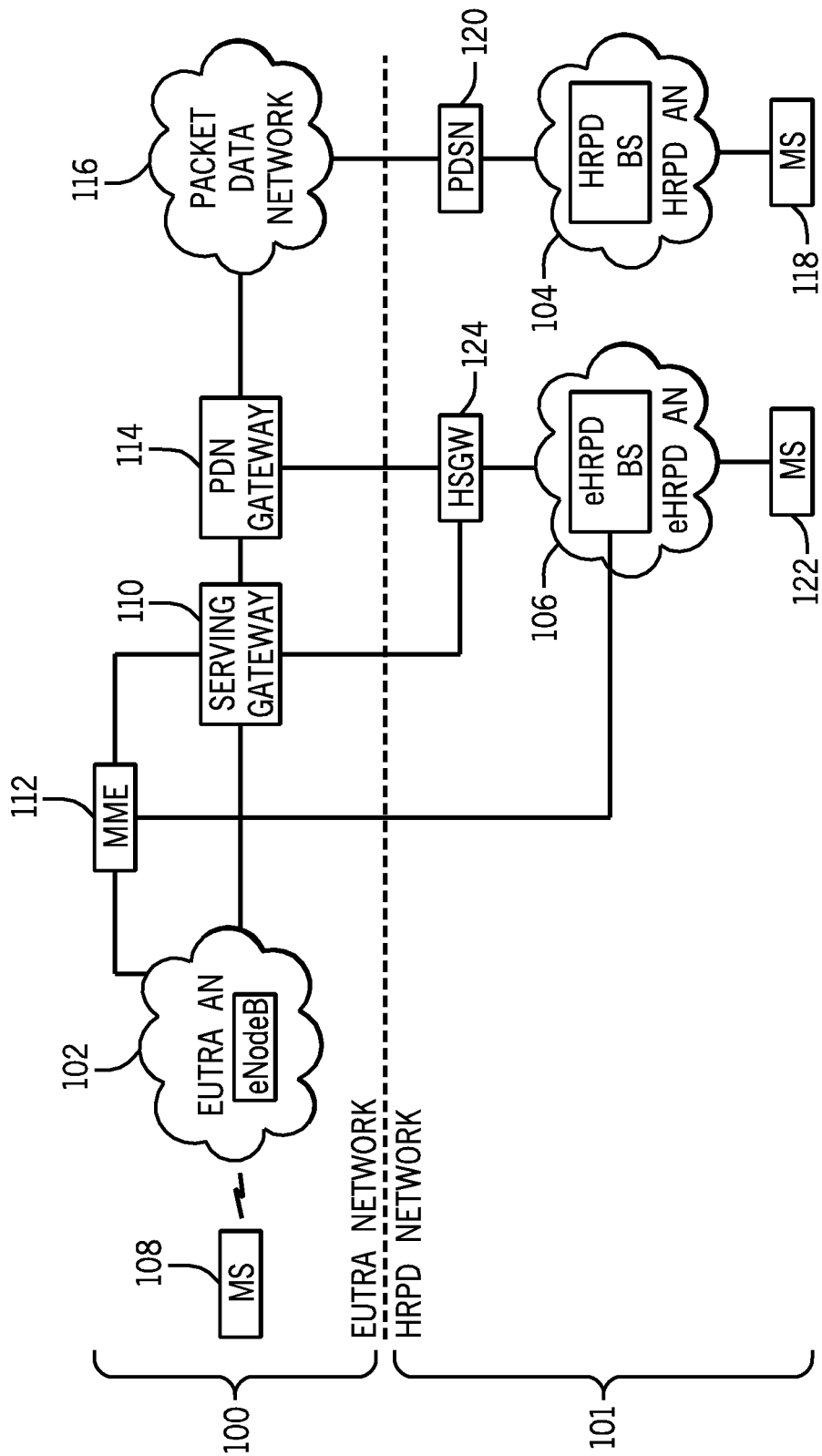
FIG. 1 illustrates an example arrangement of a mobile telecommunications network incorporating some embodiments.

Wireless network operators are migrating to fourth generation (4G) wireless networks. One such type of 4G wireless network is the Long Term Evolution (LTE) wireless network, as defined by the Third Generation Partnership Project (3GPP). The LTE standard is also referred to as the EUTRA (Evolved Universal Terrestrial Radio Access) standard. Another alternative 4G wireless technology is WiMAX (Worldwide Interoperability for Microwave Access), as defined by IEEE 802.16.

As part of the migration, wireless network operators may deploy access networks of different technologies such that multi-mode mobile stations can seamlessly operate with either or both of the access networks of different technologies. For example, multi-mode mobile stations can be handed off from an access network of a first type of radio access technology to an access network of a second, different type of radio access technology. Alternatively, mobile stations can perform cell selection when initially starting up from among the access networks of the different radio access technologies. In some examples, a wireless network operator can operate both HRPD (High Rate Packet Data) access networks and EUTRA access networks. HRPD is defined by the CDMA (Code Division Multiple Access) 2000 standards, as established by 3GPP2.

HRPD is an example of a third generation (3G) wireless technology. Another example of the 3G wireless technology is the Universal Mobile Telecommunication System (UMTS) technology, as defined by 3GPP. Yet another example of a 3G wireless technology is the EDGE (Enhanced Data Rates for GSM Evolution) technology, as defined by 3GPP.

Examples of other wireless technologies include Global System for Mobile (GSM) as defined by 3GPP; Worldwide Inoperability for Microwave Access (WiMAX), as defined by IEEE 802.16; and Wireless Local Area Network (WLAN), as defined by IEEE 802.11.

In other examples, other wireless protocols can be used. In the ensuing discussion, reference is made to implementations that employ the HRPD and EUTRA technologies. It is noted that in other implementations, other combinations of technologies can be employed.

In accordance with some embodiments, techniques or mechanisms are provided to allow a wireless network, such as a base station in the wireless network, to query a multi-mode mobile station regarding radio access technology capabilities of the multi-mode mobile station. Radio access technologies that can be supported by a multi-mode mobile station can include any of the radio access technologies noted above, such as EUTRA, HRPD, UMTS, WiMAX, WLAN, GSM, etc. In response to the query, the multi-mode mobile station sends, to the base station, a message containing information relating to radio access technology capabilities of the multi-mode mobile station. The information contained in the message can specify different types of radio access technologies useable by the mobile station to communicate over a wireless link between the wireless network and the mobile station. After receiving the information regarding the different types of radio access technologies supported by the multi-mode mobile station, the base station is able to control which one or more of the at least two different types of radio access technologies the mobile station is to use. For example, the base station can enable the mobile station to use a first of the multiple different types of radio access technologies, and to disable a second of the multiple different types of radio access technologies. Alternatively, the base station can enable use by the mobile station of all of the multiple different types of radio access technologies. Additionally, the base station can assign different handset capabilities to the different radio access technologies (e.g. voice only for one type, data with voice-over-Internet Protocol for another type, and data only for a further type).

By employing techniques or mechanisms according to some implementations, a base station is able to acquire a mobile station's multi-mode support information, such as through a provisioning mechanism. An example of a provisioning mechanism is according to the Over the Air Provisioning Specification (OTASP), as defined by the CDMA standards. In other implementations, a base station can acquire multi-mode support information of the multi-mode mobile station using some other query mechanism. Once the base station acquires information regarding the multi-mode capabilities of the mobile station, the base station is able to control the mobile station's access capability, such as through the provisioning mechanism or some other mechanism.

FIG. 1 illustrates an example arrangement that includes different mobile communications networks, including EUTRA network 100 and HRPD network 101. The EUTRA mobile communications network 100 includes an EUTRA access network 102, and the HRPD network 101 includes an HRPD access network 104 and an eHRPD access network 106. Although just one EUTRA access network 102, one HRPD access network 104, and one eHRPD access network 106 are depicted in FIG. 1, it is noted that typically there would be multiple EUTRA access networks, multiple HRPD access networks, and multiple eHRPD (evolved HRPD) access networks. An eHRPD wireless access network is capable of interworking with an EUTRA wireless access network. As used here, the term "access network" or "wireless access network" refers to equipment used to allow a mobile station to wirelessly connect through the access network for accessing services provided on a target network, such as a packet data network 116. Also, although just EUTRA and HRPD networks are depicted, other implementations can include other or additional types of wireless networks, such as WiMAX, WLAN, and so forth.

According to the EUTRA technology, the EUTRA access network 102 includes an enhanced node B (eNode B), which is a type of base station. The HRPD access network 104 includes an HRPD base station, and the eHRPD access network 106 includes an eHRPD base station. A base station can perform one or more of the following tasks: radio resource management, mobility management for managing mobility of mobile stations, routing of traffic, and so forth. Generally, the term "base station" can refer to a cellular network base station or access point used in any type of wireless network, or any type of wireless transmitter/receiver to communicate with mobile stations. The term "base station" can also encompass an associated controller, such as a base station controller or a radio network controller. It is contemplated that the term "base station" also refers to a femto base station or access point, a micro base station or access point, or a pico base station or access point. A "mobile station" can refer to a telephone handset, a portable computer, a personal digital assistant (PDA), or an embedded device such as a health monitor, attack alarm, and so forth.

As depicted in FIG. 1, in the EUTRA mobile communications network 100, a mobile station 108 is currently attached wirelessly to the EUTRA access network 102. The EUTRA access network 102 is in turn connected to various components, including a serving gateway 110 and a mobility management entity (MME) 112. The MME 112 is a control node for the EUTRA access network 102. For example, the MME 112 is responsible for idle mode mobile station tracking and paging procedures. The MME 112 is also responsible for choosing the serving gateway for a mobile station at initial attach and at time of handover. The MME 112 is also responsible for authenticating the user of the mobile station.

The serving gateway 110 routes bearer data packets. The serving gateway 110 also acts as a mobility anchor for the user plane during handovers between different access networks. The serving gateway 110 is also connected to a packet data network (PDN) gateway 114 that provides connectivity between the mobile station 108 and the packet data network 116 (e.g., the Internet, a network that provides various service, etc.).

In the HRPD mobile communications network 101, a mobile station 118 is currently attached wirelessly to the HRPD access network 104. The HRPD access network 104 is in turn connected to a packet data serving node (PDSN) 120, which in turn is connected to the packet data network 116.

Also, to allow for interworking between the HRPD network 101 and the EUTRA network 100, the eHRPD access network 106 is provided that wirelessly attached to a mobile station 122. Note that each of the mobile stations 108, 118, and 122 can be a multi-mode mobile station. The eHRPD access network 106 is in turn connected to an HRPD serving gateway (HSGW) 124. The HSGW 124 is the entity that terminates the eHRPD access network interface from the eHRPD access network 106. The HSGW 124 routes mobile station-originated or mobile station-terminated packet data traffic. The HSGW 124 provides interworking of the mobile station with the EUTRA network 100. The interworking functions include support for mobility, policy control and charging, access authentication, roaming, and others. The HSGW 124 supports seamless inter-technology mobility transfer between the EUTRA network 100 and the eHRPD access network 106.

Reference to the EUTRA, HRPD, and eHRPD (and other) standards is intended to refer to the current standards, as well as standards that evolve over time. It is expected that future standards evolve from EUTRA, HRPD, or eHRPD (or other standards) may be referred by different names. It is contemplated that reference to "EUTRA," "HRPD," or "eHRPD" (or another standard) is intended to cover such subsequently evolved standards as well. Also, as noted above, techniques or mechanisms are applicable for systems employing other types of wireless protocols.

Figure 2:
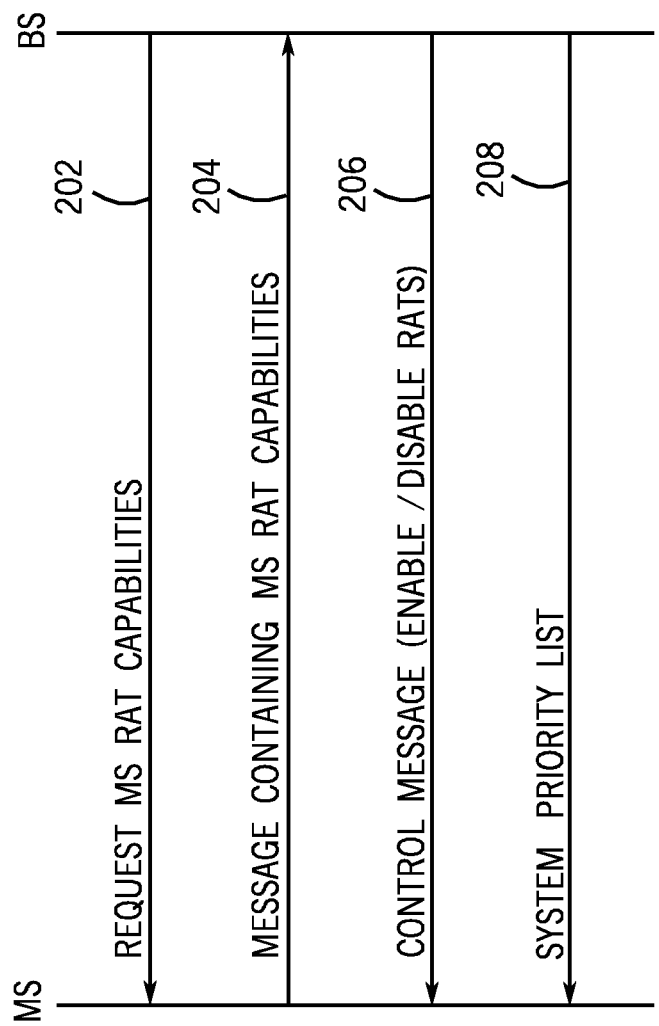
FIG. 2 is a message flow diagram of a process performed according to some embodiments.

FIG. 2 is a message flow diagram of a process according to some embodiments. The base station is able to send (at 202) a request that seeks a multi-mode mobile station's radio access technology capabilities. The sending of the request at 202 can be part of a provisioning procedure performed with respect to the mobile station, which is to provision various parameters of the mobile station and to perform other tasks. In other implementations, the request sent at 202 can be during other operations of the base station.

In response to the request, the mobile station sends (at 204) a message that contains the mobile station's radio access technology capabilities. The message can identify all radio access technologies supported by the mobile station, selected from among, for example, EUTRA, HRPD, GSM, WiMAX, WLAN, UMTS, EDGE, and so forth. The message that carries the mobile station's radio access technology capabilities can be an existing message, or a new message. The information regarding the mobile station's radio access technology capabilities can be in a record contained within a message.

Upon receiving the message containing the mobile station's radio access technology capabilities, the base station can send a control message (at 206) to the mobile station, where the control message is able to selectively enable or disable selected ones of the different types of radio access technologies that are supported by the mobile station. For example, the control message can be part of another message that is typically exchanged between the base station and mobile station. Alternatively, the control message sent at 206 can be a new message. In some implementations, the control message can contain a bitmap having multiple bits, where the bits of the bitmap are selectively settable to an enable state or disable state to selectively enable or disable, respectively, corresponding ones of radio access technologies supported by the mobile station (as reported in the message communicated at 204). Alternatively, the control message can include a record listing various radio access technologies and associated fields, where the fields are settable to an enable state or disable state to enable or disable, respectively, corresponding ones of the different radio access technologies that are useable by the mobile station to communicate over the wireless link.

In this manner, a wireless operator can control the access capabilities of the mobile station using the control message sent at 206.

FIG. 2 further shows another message (a system priority list) that can be sent from the base station to the mobile station (at 208), in some implementations. The system priority list is a list of different types of radio access technologies for assisting the multi-mode mobile station in selecting one of the multiple different types of radio access technologies to use for accessing the system. Traditionally, all radio access technologies specified in such a system priority list, such as a system priority list defined by the CDMA standards, have to be listed as supporting both voice and data. However, in accordance with some embodiments, the system priority list allows for different capabilities to be associated with each of the different radio access technologies listed in the system priority list. For example, one capability is voice only, where the corresponding radio access technology is to be used for communicating voice only. Another capability is data with voice-over-Internet Protocol (VoIP) not allowed, which means that the corresponding radio access technology is not to be used for data with VoIP. Yet another capability is data with VoIP allowed, which means that the corresponding radio access technology can be used to support data with VoIP.

By being able to specify different capabilities for different types of radio access technologies, further flexibility is provided to allow the wireless network to control usage of the different radio access technologies by mobile stations.

Figure 3:
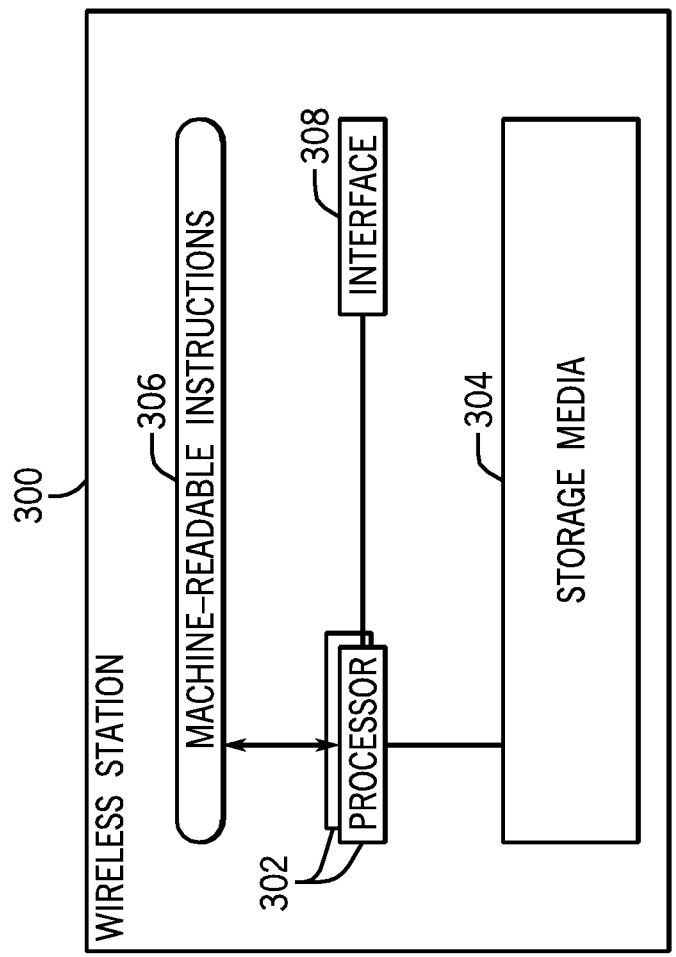
FIG. 3 is a block diagram of a wireless station according to some examples.

FIG. 3 is a block diagram of a wireless station 300, which can either be a mobile station (e.g., mobile station 108, 118, or 122 in FIG. 1) or a base station (e.g., eNodeB, HRPD base station, or eHRPD base station in FIG. 1). The wireless station 300 includes a processor (or multiple processors) 302, which is (are) connected to storage media 304. Machine readable instructions 306 are executable on the processor(s) 302 to perform respective tasks associated with the wireless station 300, such as tasks depicted in FIG. 2 or 3. The wireless station 300 also includes an interface 308 for communicating over a wireless link, such as a radio frequency (RF) link.

The machine-readable instructions 306 are loaded for execution on the processor(s) 302. A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:

sending, by a base station, a request for information relating to radio access technology capabilities of a mobile station;

receiving, by the base station, a first message containing the information relating to radio access technology capabilities of the mobile station, wherein the first message is responsive to the request, and the information contained in the first message specifies that the mobile station supports at least two different types of radio access technologies useable by the mobile station to communicate over a wireless link between the base station and the mobile station; and controlling, by the base station, which of the at least two different types of radio access technologies the mobile station is to use, and which respective one of at least two different types of connections to use for each of the at least two different types of radio access technologies, wherein the controlling comprises the base station sending, to the mobile station, a second message containing a record listing the at least two different types of radio access technologies and associated fields settable to an enable state or a disable state to enable or disable, respectively, corresponding ones of the at least two different types of radio access technologies; and sending, by the base station, a list to the mobile station, wherein the list identifies plural types of radio access technologies and assigned capabilities of the corresponding plural types of radio access technologies, wherein the assigned capabilities are selected from among: voice only, voice-over-Internet Protocol (VoIP) not allowed, and VoIP allowed, wherein the at least two different types of radio access technologies are selected from the group consisting of an Evolved Universal Terrestrial Ratio Access (EU- TRA) technology, a Universal Mobile Telecommunication System (UMTS) technology, a Code Division Multiple Access (CDMA) technology, a Global System for Mobile (GSM) technology, a Worldwide Interoperability for Microwave Access (WiMAX) technology, a Wireless Local Area Network (WLAN) technology, an Enhanced Data Rates for GSM Evolution (EDGE) technology, and a High Rate Packet Data (HRPD) technology.

2. The method of claim 1, wherein sending the request is part of a provisioning procedure to be performed with respect to the mobile station.

3. A method comprising:
receiving, by a multi-mode mobile station, a request for information relating to radio access technology capabilities of the mobile station;
in response to the request, sending, from the mobile station to a base station, a message containing the information relating to radio access technology capabilities of the mobile station, wherein the information contained in the message specifies that the mobile station supports at least two different types of radio access technologies useable by the mobile station to communicate over a wireless link between the mobile station and the base station; and
receiving, by the mobile station from the base station, a control message controlling which of the at least two different types of radio access technologies the mobile station is to use, and which respective one of at least two different types of connections to use for each of the at least two different types of radio access technologies, wherein the received control message contains a record listing the at least two different types of radio access technologies and associated fields set to an enable state or a disable state to enable or disable, respectively, corresponding ones of the at least two different types of radio access technologies; and
receiving, by the mobile station, a list from the base station, wherein the list identifies plural types of radio access technologies and assigned capabilities of the corresponding plural types of radio access technologies, wherein the assigned capabilities are selected from among: voice only, voice-over-Internet Protocol (VoIP) not allowed, and VoIP allowed,
wherein the at least two different types of radio access technologies are selected from the group consisting of an Evolved Universal Terrestrial Ratio Access (EUTRA) technology, a Universal Mobile Telecommunication System (UMTS) technology, a Code Division Multiple Access (CDMA) technology, a Global System for Mobile (GSM) technology, a Worldwide Interoperability for Microwave Access (WiMAX) technology, a Wireless Local Area Network (WLAN) technology, an Enhanced Data Rates for GSM Evolution (EDGE) technology, and a High Rate Packet Data (HRPD) technology.

4. The method of claim 3, wherein the received control message specifies that all of the at least two different types of radio access technologies are enabled for use by the mobile station.

5. The method of claim 1, wherein the received control message specifies that at least one of the at least two different types of radio access technologies is disabled from use by the mobile station.

6. A base station comprising:
an interface to wirelessly communicate with a mobile station; and
at least one processor configured to:
send, to a mobile station, a request for information relating to radio access technology capabilities of the mobile station;
receive, from the mobile station, a first message containing the information relating to radio access technology capabilities of the mobile station, wherein the first message is responsive to the request, and the information contained in the first message specifies that the mobile station supports plural different types of radio access technologies useable by the mobile station to communicate over a wireless link between the base station and the mobile station;
control which of the plural different types of radio access technologies the mobile station is to use, and which respective one of at least two different types of connections to use for each of the at least two different types of radio access technologies, wherein to perform the control, the at least one processor is configured to transmit, to the mobile station, a second message containing a record listing the plural different types of radio access technologies and associated fields settable to an enable state or a disable state to enable or disable, respectively, corresponding ones of the plural different types of radio access technologies usable by the mobile station to communicate over the wireless link with the base station; and
send, to the mobile station, a list, wherein the list identifies plural types of radio access technologies and assigned capabilities of the corresponding plural types of radio access technologies, wherein the assigned capabilities are selected from among: voice only, voice-over-Internet Protocol (VoIP) not allowed, and VoIP allowed,
wherein the plural different types of radio access technologies are selected from the group consisting of an Evolved Universal Terrestrial Ratio Access (EUTRA) technology, a Universal Mobile Telecommunication System (UMTS) technology, a Code Division Multiple Access (CDMA) technology, a Global System for Mobile (GSM) technology, a Worldwide Interoperability for Microwave Access (WiMAX) technology, a Wireless Local Area Network (WLAN) technology, an Enhanced Data Rates for GSM Evolution (EDGE) technology, and a High Rate Packet Data (HRPD) technology.

7. A mobile station comprising:
an interface to communicate wirelessly with a base station; and
at least one processor configured to:
receive a request for information relating to radio access technology capabilities of the mobile station;
in response to the request, send, to a base station, a message containing the information relating to radio access technology capabilities of the mobile station, wherein the information contained in the message specifies that the mobile station supports plural different types of radio access technologies useable by the mobile station to communicate over a wireless link between the mobile station and the base station;
receive, from the base station, a control message controlling which of the plural different types of radio access technologies the mobile station is to use, and which respective one of at least two different types of connections to use for each of the at least two different types of radio access technologies, wherein the control message contains a record listing the plural different types of radio access technologies and associated fields set to an enable state or a disable state to enable or disable, respectively, corresponding ones of the plural different types of radio access technologies; and receive, from the base station, a list, wherein the list identifies plural types of radio access technologies and assigned capabilities of the corresponding plural types of radio access technologies, wherein the assigned capabilities are selected from among: voice only, voice-over-Internet Protocol (VoIP) not allowed, and VoIP allowed, wherein the plural different types of radio access technologies are selected from the group consisting of an Evolved Universal Terrestrial Ratio Access (EUTRA) technology, a Universal Mobile Telecommunication System (UMTS) technology, a Code Division Multiple Access (CDMA) technology, a Global System for Mobile (GSM) technology, a Worldwide Interoperability for Microwave Access (WiMAX) technology, a Wireless Local Area Network (WLAN) technology, an Enhanced Data Rates for GSM Evolution (EDGE) technology, and a High Rate Packet Data (HRPD) technology.

8. The mobile station of claim 7, wherein the received control message specifies that selected one or more of the plural different types of radio access technologies are enabled for use by the mobile station, while other one or more of the plural different types of radio access technologies are disabled from use by the mobile station.

* * * * *